United States Patent [19]

Esser et al.

[11] 3,926,880

[45] Dec. 16, 1975

[54] LATEX-RESIN MIXTURES

[75] Inventors: Heinz Esser, Burscheid; Jürgen Boldt, Opladen, both of Germany

[73] Assignee: Bayer Aktiengesellschaft, Leverkusen, Germany

[22] Filed: June 24, 1974

[21] Appl. No.: 482,349

Related U.S. Application Data

[63] Continuation of Ser. No. 294,954, Oct. 4, 1972, abandoned.

[30] Foreign Application Priority Data

Oct. 7, 1971  Germany............................ 2149999

[52] U.S. Cl...... 260/27 BB; 260/29.7 NR; 260/29.8
[51] Int. Cl.²............................................ C08L 93/00
[58] Field of Search ...... 260/23.7 XA, 27, 29.7 NR, 260/29.7 UA

[56] References Cited

UNITED STATES PATENTS

| | | | |
|---|---|---|---|
| 3,198,760 | 8/1965 | Widenor | 260/27 |
| 3,492,276 | 1/1970 | Smith | 260/79 |

FOREIGN PATENTS OR APPLICATIONS

| | | | |
|---|---|---|---|
| 642,607 | 6/1957 | Canada | 260/27 BU |
| 478,717 | 11/1951 | Canada | 260/27 BB |

*Primary Examiner*—Lewis T. Jacobs
*Attorney, Agent, or Firm*—Connolly and Hutz

[57] ABSTRACT

Stable aqueous dispersions which contain 20 to 60 parts by weight of chloroprene homopolymers and copolymers and 0.5 to 30 parts by weight of an adhesive-fying resin and which are free from organic solvents.

3 Claims, No Drawings

LATEX-RESIN MIXTURES

CROSS-REFERENCE TO RELATED APPLICATION

This application is a continuation of application Ser. No. 294,954 filed Oct. 4, 1972 now abandoned.

This invention relates to solvent-free latex resin mixtures and to processes for producing them.

It is known to use natural rubber latex or synethetic rubber latices as adhesive dispersions. Films of such adhesive dispersions generally have good cohesion but their adhesion is usually unsatisfactory. It is also known that the adhesion of these substances can be substantially increased by the addition of suitable resins, e.g. terpenephenol resins, terpene resins, coumarone-indene resins, colophony esters, pentaerythritol esters and alkyl phenols. Latices are aqueous dispersions and therefore any substances which are to be added to them must be available in the form of aqueous solutions, emulsions or dispersions in order that they may be miscible. Hence these resins cannot be added directly to the latices because they are insoluble in water. The resins are therefore dissolved in an organic solvent, the resulting solution is emulsified in water and the resulting emulsion is added to the latex. The addition of the resin emulsion results in excessive dilution of the latex so that it becomes very difficult to produce thicker layers of adhesive. Apart from that, the use of solvents is disadvantageous for various reasons since the solvents used are generally inflammable and physiologically harmful substances such as aromatic compounds, hydroaromatic compounds or terpenes. Moreover, many solvents have a destabilizing effect on the latices and reduce the stability of the latex mixtures on storage.

This invention relates to stable aqueous dispersions which are free from organic solvents and contain 20 to 60 parts by weight of chloroprene homopolymers or copolymers and 0.5 to 30 parts by weight of an adhesivefying resin.

Another object of this invention is a process for the production of a stable aqueous dispersion which contains 20 to 60 parts by weight of chloroprene homopolymer or copolymer and 0.5 to 30 parts by weight of an adhesivefying resin, wherein the solution of an adhesifying resin in chloroprene and/or some other monomer which is contained in the latex in a polymerised form is mixed with a chloroprene homopolymer or copolymer latex which contains an excess of emulsifier, the chloroprene and/or other monomers are removed and the mixture is concentrated, if required, to a solids content of 50 to 60 percent by weight.

The invention also relates to a modification of the process, wherein an adhesivefying resin is dissolved in chloroprene and if desired in comonomers, the solution is polymerised in aqueous emulsion to a conversion of not more than 75 percent, unreacted monomer is removed and the resulting latex is concentrated if desired to a solids content of 50 to 60 percent by weight.

Any chloroprene polymer latices which contain an excess of emulsifier are in principle suitable for the invention, for example chloroprene homopolymer latices or copolymer latices may be used. Suitable comonomers are, for example; 2,3-Dichlorobutadiene-(1,3), acrylonitrile, methacrylic acid, acrylic acid and their esters or hydroxyl esters with polyhydric alcohols such as ethane-dioldimethacrylate. These comonomers are generally used in quantities of up to 20 percent by weight, based on the amount of chloroprene.

Chloroprene polymer latices can be prepared by known methods of emulsion polymerisation. The monomer or monomers are generally emulsified in water and polymerisation is initiated with peroxide catalysts (e.g. potassium or ammonium persulphate, cumene hydroperoxide) and reducing agents such as formamidine sulphinic acid. Polymerisation can be regulated in the usual manner, e.g. using alkyl mercaptans such as n-dodecylmercaptan and/or alkylxanthogen disulphides (e.g. those containing 1–8 carbon atoms in the alkyl group). The polymerisation temperature employed is generally −40°C to +100°C, preferably 10°C to 50°C, and the amount of conversion by polymerisation is generally 60 to 95 percent, preferably 65 to 80 percent.

The following are examples of suitable emulsifiers for preparing the monomer emulsion. For alkaline polymerisation: disproportionated abietic acid or its salts, alkyl sulphates, alkylsulphonates, arylsulphonates and alkylarylsulphonates in which the alkyl radicals preferably contain 12 to 18 carbon atoms, oleic acid and its salts.

If desired, abietic acid derivatives and arylsulphonates may be combined.

For polymerisation in acid medium, the above mentioned sulphonates as well as hydrohalic acid salts of long chained amines, e.g. trimethylcetyl-ammonium bromide, stearylamine hydrochloride and abietylamine hydrochloride may be used. For polymerisation in either acid or basic medium, aminocarboxylic acids containing 12 to 18 carbon atoms and nonionic emulsifiers, e.g. ethoxylation products of long chain alcohols or alkylphenols, may be used. The quantity of emulsifiers used is generally 2 to 5 percent by weight, based on the quantity of monomers.

By adhesivefying resins in the context of this invention are meant any natural or synethetic resins which are suitable for improving the adhesive power of adhesive mixtures. Terpene-phenol resins, terpene resins, coumarone-indene resins, colophony, colophony esters, pentaerythritol, pentaerythritol esters and alkyl phenols are particularly suitable. The quantity of resin used is generally about 5 to 30 percent by weight of the quantity of chloroprene polymer.

For carrying out the process of the invention, it is particularly advantageous to start with a chloroprene homopolymer or copolymer latex which has a solids content of 20 to 30 percent by weight. This latex should have been produced by polymerisation to a conversion of not more than 75 percent. The remaining monomer is removed without inactivating the polymerisation catalyst. The solution of resin, preferably in chloroprene, is then added to this latex, and the chloroprene is then removed by steam distillation. The resulting mixture can then be concentrated by creaming in the usual manner.

When carrying out this process, it may be necessary to add additional emulsifier to the chloroprene polymer latex in order that the solution of resin will emulsify in the latex. The above mentioned emulsifiers, for example, may be used for this purpose.

Instead of using the polymer latex, a solution of a suitable resin in chloroprene or a mixture of chloroprene and suitable comonomers may be used as starting material. This mixture may be polymerised in the usual manner after it has been emulsified in water. In this variation of the process, polymerisation is stopped after 65 to 75 percent conversion and the residual monomer is removed by distillation. The resulting mixture may then be creamed in the usual manner to concentrate it to a solids content of 50 to 60 percent.

Resin-latex mixtures obtained in this way are particularly suitable for use as so-called adhesive dispersions. Since they contain no organic solvent, they have considerably advantages over conventional adhesive dispersions. For example, bonds produced with such adhesives withstand higher shearing forces and show improved resistances to separation then bonds produced with comparable products which contain organic solvents. Moreover, the viscosity of the latex-resin mixtures is exceptionally low due to the absence of organic solvent. This in many cases facilitates their technical application.

The latex resin mixtures according to the invention can be used for bonding a wide variety of materials, for example leather, wood, textiles and plastics, and the bonds may be between the same or different materials. The latex resin mixtures according to the invention are therefore used particularly advantageously in the manufacture of shoes and for bonding textiles, paper and wood.

EXAMPLES

I. Preparation of the polychloroprene latex

100 Parts by weight of 2-chlorobutadiene-(1,3) (chloroprene) which has been stabilized with 150 ppm of phenothiazine and 0.12 parts by weight of n-dodecylmercaptan are emulsified with a solution consisting of 5.0 parts by weight of the sodium salt of a disproportionated abietic acid, 0.7 parts by weight of the sodium salt of a condensate of naphthalene sulphonic acid and formaldehyde, 0.75 parts by weight of sodium hydroxide and 0.5 parts by weight of sodium phosphate in 160 parts by weight of water.

This emulsion is polymerised under an atmosphere of nitrogen at 10°C by the addition of a 1% aqueous solution of formamidine sulphinic acid.

When 70 percent of the emulsion has polymerised (5–7 hours), the remaining unpolymerised chloroprene is immediately removed from the dispersion without polymerisation being first stopped. To remove this unpolymerised chloroprene, the latex is mixed with hot steam in a separate apparatus at reduced pressure which causes the polymer dispersion to separate from the unreacted monomer which evaporates and is subsequently recondensed with excess steam.

7.5 percent by weight of zinc oxide and 2 percent by weight of phenolic age resistor (quantities based on the amount of solid polychloroprene) are added to the latex.

II. Preparation of the solvent-free latex-resin dispersions

A solution consisting of 1.0 parts by weight of chloroprene (stabilised) and 0.51 parts by weight of resin or 0.33 parts by weight of resin is added with stirring to 10 parts by weight of the polychloroprene dispersion (polymer concentration 25.5 percent) obtained according to I. After vigorous mixing, chloroprene is removed as described above. The homogeneous polychloroprene latex which now contains resin is creamed up by the addition of sodium alginate (2.2 g/kg of latex) to concentrate it to 56.6 percent.

The following resins were used in different cases:

II A.
0.51 Parts by weight of colophony ester (Trade designation: Ester Gum 8 D; Manufacturers: Hercules Powder, Wilmington, Del.)

II B.
0.51 Parts by weight of hydrogenated colophony ester (Trade designation: Staybelite Ester 10; Manufacturers: Hercules Powder, Wilmington, Del.)

II C.
Pentaerythritol ester (Trade designation: Pentalyn A; Manufactureres: Hercules Powder, Wilmington, Del.)

II D.
0.33 Parts by weight of terpene-phenol resin (Trade designation: Durez resin 12603; Manufacturers: Durex Plastics Div., Hooker Chem. Corp. North Tonawanda, N.Y.).

III. Preparation of polychloroprene latices which contain solvent (for comparison)

The resins are dissolved in toluene with the addition of oleic acid and the resulting solution is emulsified in water which contains emulsifier at 70 to 80°C, using a high speed stirrer. The composition of these emulsions is as follows:

III A.
Colophony ester dispersion a. Resin solution
   100 Parts by weight of colophony ester (Trade designation: Ester Gum 8 D, 8 L) 30 percent
   75 parts by weight of toluene
   5 parts by weight of oleic acid
b. aqueous phase
   5 parts by weight of triethanolamine
   50 parts by weight of NH$_4$-caseinate 10 percent
   98 parts by weight of water III B.
Hydrogenated colophony ester
a. Resin solution
   100.0 Parts by weight of hydrogenated colophony ester (Trade designation: Staybelite Ester 10) 50 percent
   25.5 parts by weight of toluene
   1.5 parts by weight of oleic acid
b. aqueous phase
   16.5 parts by weight of potassium hydroxide, 10 percent
   10.0 parts by weight of NH$_4$-caseinate, 10 percent
   47.0 parts by weight of water III C.
Pentaerythritol ester
a. Resin solution
   100 Parts by weight of pentaerythritol ester (Trade designation: Pentalyn A) 40 percent
   50 parts by weight of toluene
   10 parts by weight of oleic acid
b. aqueous phase
   6 parts by weight of triethanolamine
   84 parts by weight of water III D.
  Terpene-phenol resin
  a. Resin solution
    100 Parts by weight of terpene-phenol resin (Trade designation: Durez-resin 12.603) 30 percent
    75 parts by weight of toluene
    5 parts by weight of oleic acid
  b. aqueous phase
    5 parts by weight of triethanolamine
    50 parts by weight of $NH_4$-caseinate 10 percent
    98 parts by weight of water.

These resin emulsions were mixed with the polychloroprene latex described under I so that the resin-latex mixture had the same composition as the mixtures described under II.

The compositions of the resulting resin-latex mixtures are summarised in Table I.

Table I

| Parts by weight | II A | III A | II B | III B | II C | III C | II D | III D |
|---|---|---|---|---|---|---|---|---|
| Polychloroprene (dry substance) | 100 | 100 | 100 | 100 | 100 | 100 | 100 | 100 |
| Zinc oxide | 7.5 | 7.5 | 7.5 | 7.5 | 7.5 | 7.5 | 7.5 | 7.5 |
| phenolic age resistor | 2.0 | 2.0 | 2.0 | 2.0 | 2.0 | 2.0 | 2.0 | 2.0 |
| colophony ester | 20 | 20[1] | | | | | | |
| hydrogenated colophony ester | | | 20 | 20[1] | | | | |
| pentaerythritol ester | | | | | 20 | 20[1] | | |
| terphenol resin | | | | | | | 15 | 15[1] |

[1]in the form of an aqueous emulsion of a toluene solution

IV. Bonding tests

Various bonds were produced with resin-latex mixtures II A–D and III A–D and the strengths of the bonds were determined. Both the shear strengths according to DIN 53.253 (wood/wood bonds, dimensions kg/cm²) and the resistances to separation according to DIN 53.274 (bonds of flexible materials, dimensions kg/cm) were determined. The results are summarised in Table II below.

Table II

| Bond | II A | III A | II B | III B | Strengths of Bonds II C | III C | II D | III D |
|---|---|---|---|---|---|---|---|---|
| Wood/wood (kg/cm²) | 38.0 | 33.7 | | | 38.5 | 35.2 | | |
| Leather/leather (kg/cm) | 3.4 | 2.9 | | | | | | |
| Wood/leather (kg/cm) | 4.8 | 4.6 | 3.6 | 2.9 | | | | |
| Cotton/cotton (kg/cm) | 4.7 | 4.1 | | | 5.1 | 4.8 | 4.0 | 3.5 |
| Dralon/dralon (kg/cm) | 4.7 | 1.6 | 2.6 | 1.9 | | | 6.6 | 2.1 |
| PVC surface filler for composition flooring (kg/cm²) | 11.4 | 9.5 | | | | | | |

We claim:

1. A process for producing a stable aqueous dispersion which comprises mixing (1) a preformed aqueous dispersion of a chloroprene polymer which is a homopolymer thereof or a copolymer of chloroprene with up to 20 percent by weight, based on chloroprene, of 2,3-dichlorobutadiene-(1,3), acrylonitrile, methacrylic acid, acrylic acid or an ester or hydroxy ester of acrylic acid or methacrylic acid with a polyhydric alcohol and (2) a solution of a natural or synthetic resin which improves the adhesive power of adhesive mixtures, in chloroprene or a mixture of said monomers of said chloroprene copolymer, there being from 5 to 30 percent by weight of said natural or synthetic resin in resulting mixture based on said chloroprene polymer, and subsequently removing the chloroprene monomer or said mixture of monomers from said mixture of (1) and (2) to obtain said stable aqueous dispersion.

2. The process of claim 1 wherein the stable aqueous dispersion is concentrated to a solids content of 50 to 60percent by weight.

3. The process of claim 1 wherein said resin is selected from the group of resins consisting of terpene-phenol, terpene, coumarone-indene, colophony, colophony esters, pentaerythritol, pentaerythritol esters and alkyl phenol resins.

* * * * *